US007238095B1

(12) United States Patent
Sun et al.

(10) Patent No.: US 7,238,095 B1
(45) Date of Patent: Jul. 3, 2007

(54) PNEUMATIC GRINDER WITH IMPROVED MUFFLING STRUCTURE

(75) Inventors: Yung-yung Sun, Dali (TW); Chuan-ching Cheng, Taichung (TW)

(73) Assignee: Storm Pneumtic Tool Co., Ltd., Taichung County (TW)

( * ) Notice: Subject to any disclaimer, the term of this patent is extended or adjusted under 35 U.S.C. 154(b) by 0 days.

(21) Appl. No.: 11/601,826

(22) Filed: Nov. 20, 2006

(51) Int. Cl.
*B25F 5/02* (2006.01)
*B23B 45/00* (2006.01)

(52) U.S. Cl. ...................... 451/344; 451/357; 173/104; 173/117

(58) Field of Classification Search ................ 451/344, 451/357, 358, 359, 294, 295; 173/104, 117, 173/217
See application file for complete search history.

(56) References Cited

U.S. PATENT DOCUMENTS 1,727,718 A * 9/1929 Kinsey ........................ 60/695
3,891,049 A * 6/1975 Stroezel et al. ............. 181/230
4,113,052 A * 9/1978 McElroy, Jr. ............... 181/230
5,017,109 A * 5/1991 Albert et al. ............... 418/152
5,383,771 A * 1/1995 Ghode et al. ................. 418/15
5,911,281 A * 6/1999 Treskog et al. ............. 173/104
6,751,952 B2 * 6/2004 Chen ........................... 60/407
2002/0139547 A1 * 10/2002 Nowak et al. ................. 173/1

* cited by examiner

*Primary Examiner*—Lee D. Wilson
*Assistant Examiner*—Anthony Ojini
(74) *Attorney, Agent, or Firm*—Rosenberg, Klein & Lee

(57) ABSTRACT

A pneumatic grinder with improved muffling structure primarily comprises a driving portion, a grinding wheel fixing portion provided at one end of the driving portion, a first housing connected to the other end of the driving portion by means of a combining portion, a second housing mounted onto the first housing, and a plurality of first and second exhaust openings arranged in staggered fashion respectively on the first and second housings. Said structure allows the pneumatic grinder to discharge waste air through foresaid two layers of exhaust openings in staggered fashion arranged in order to reduce noise during air exhaust.

4 Claims, 4 Drawing Sheets

PNEUMATIC GRINDER WITH IMPROVED MUFFLING STRUCTURE

BACKGROUND OF THE INVENTION

1. Technical Field

The present invention relates to a pneumatic grinder with improved muffling structure, and more particularly, to a pneumatic grinder exhausting waste air with reduced noise.

2. Description of Related Art

Implementing high-pressure airflow to drive a pneumatic motor and in turn propel a grinding wheel to rotate is the operational principle upon which a pneumatic grinder is based. Therefore, it is necessary for such a pneumatic grinder to discharge waste air which has passed through the pneumatic motor to the outside for promoting air circulation. According to conventional design, a pneumatic grinder typically has the waste air guided to and discharged through an exhaust port provided at the rear part or either side thereof. One problem with such a design is that noise can be considerably generated during air exhaust. Though silencing cotton has been added to a conventional pneumatic grinder, as shown in FIG. 4, for the purpose of reducing noise, it is still not an effective solution to moderate the piercing noise brought by the discharge of waste air. Such noise can consequently induce hearing loss of a perpetual pneumatic grinder operator.

SUMMARY OF THE INVENTION

The present invention has been accomplished with these circumstances in mind. It is one object of the present invention to provide a pneumatic grinder with improved structure whereby the waste airflow can be dispersed when flowing through the two layers of staggered exhaust openings so that the noise incurred by air exhaust during operation of the grinder can be effectively reduced.

Another object of the present invention in addition to reducing noise is that the disclosed pneumatic grinder has an air exhaust mechanism that leads waste air to be discharged at either side thereof. Since the exhaust openings of the first and second housings of the grinder according to the present invention are positioned respectively at the opposite sides with respect to the grinders, the waste air can be discharged through the exhaust openings of the second housing so that discomfort to the grinder operator caused by direct puffing of the waste air can be avoided.

To achieve these and other objects of the present invention, the pneumatic grinder with improved muffling structure comprises:

a first housing which is fixed at one end of the driving portion by the compressing of the combining portion, and having a plurality of first exhaust openings penetrating through the inner surface and outer surface of the first housing and a first limit segment provided at the outer surface thereof; and a second housing, which is mounted around the periphery of the first housing to form an annular space between the inner surface thereof and the outer surface of the first housing, and having a second limit segment for being mated with the first limit segment whereby the second housing can be rotated around the first housing within a predetermined range, and a plurality of second exhaust openings located at the positions not corresponding to those of the first exhaust openings of the first housing.

DETAILED DESCRIPTION OF THE PREFERRED EMBODIMENT

Figure 1:
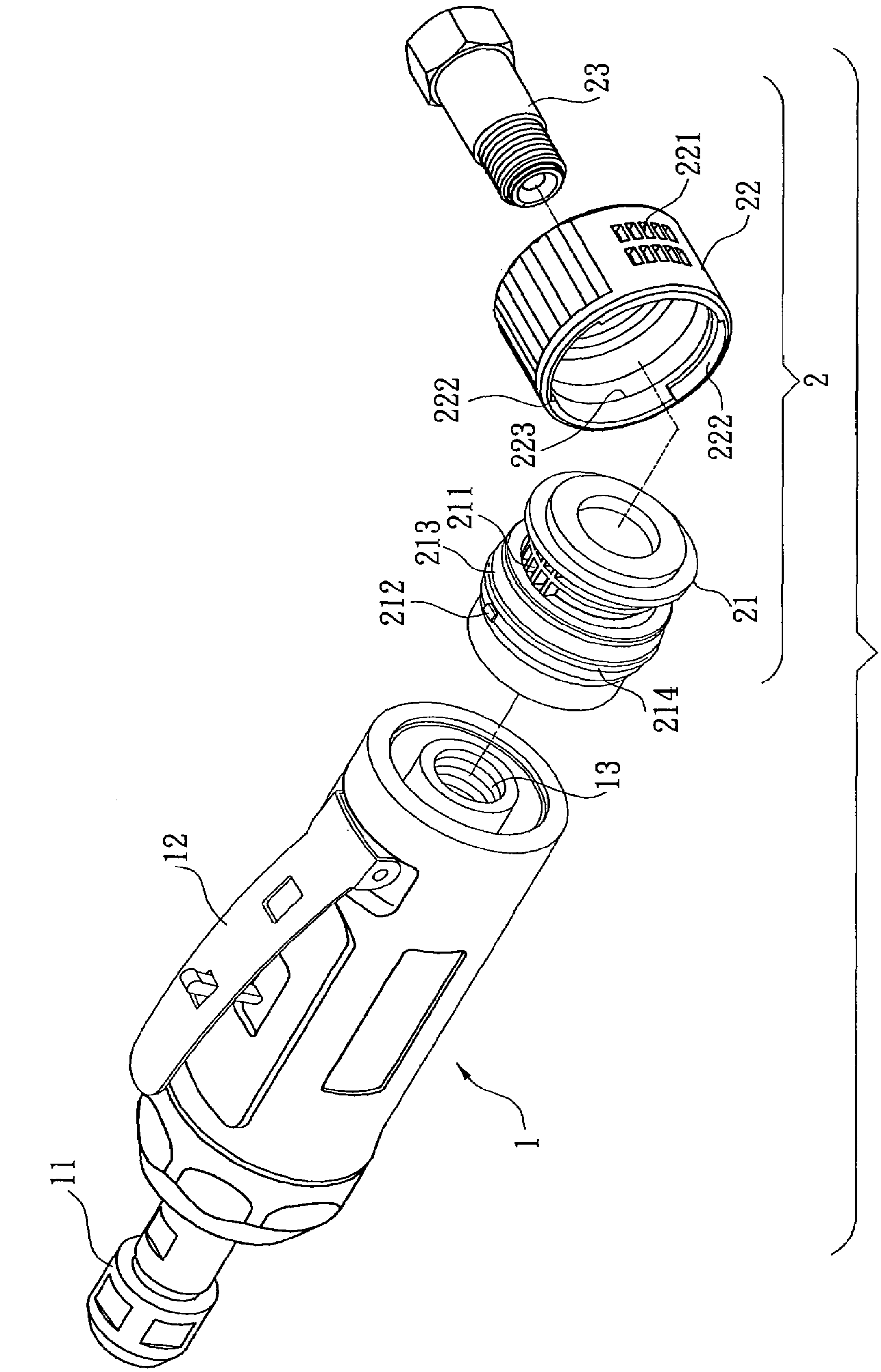
FIG. 1 is an exploded view of a pneumatic grinder with improved muffling structure according to the present invention.
Figure 2:
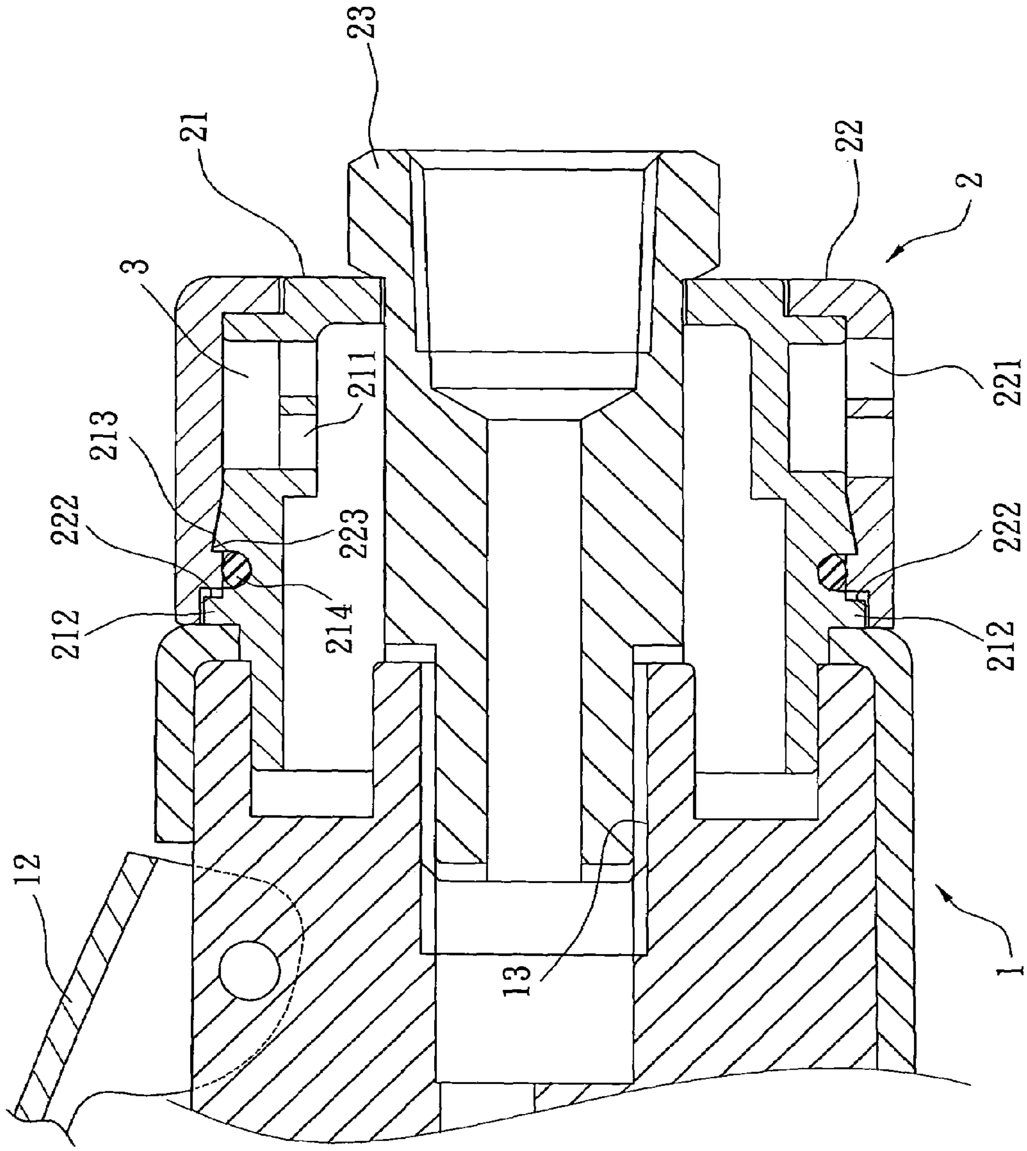
FIG. 2 is a sectional view of the disclosed pneumatic grinder according to the present invention.

Please refer to FIGS. 1 and 2, which describe a preferred embodiment of the present invention. It is to be understood that the recited figures and embodiment are for illustrating and not intended to limit the structure of the present invention.

Figure 3A:
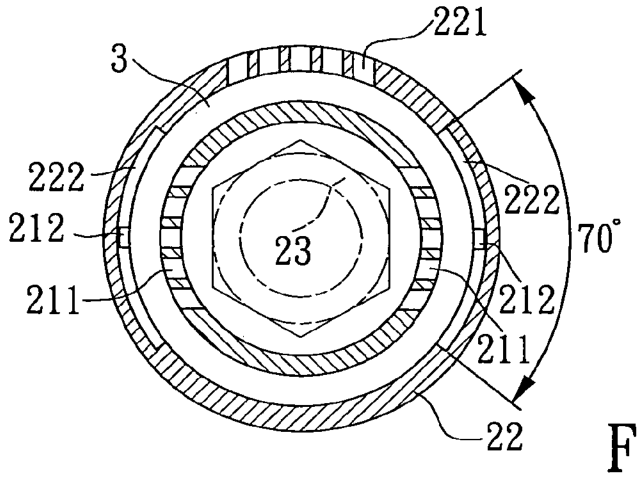
FIG. 3*a* is a schematic drawing illustrating the muffling structure of the disclosed pneumatic grinder.
Figure 3B:
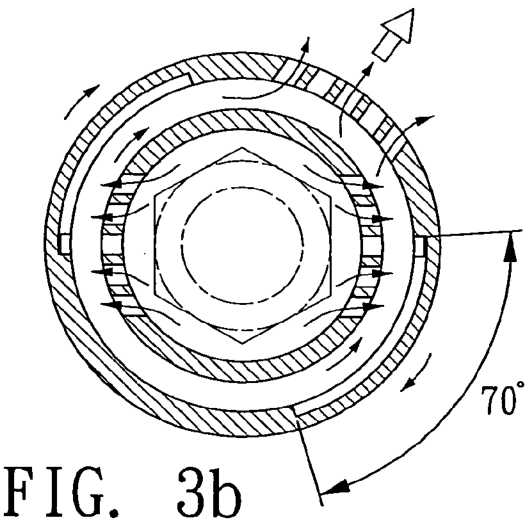
FIG. 3*b* is one applied view showing the operation of the disclosed muffling structure.
Figure 3C:
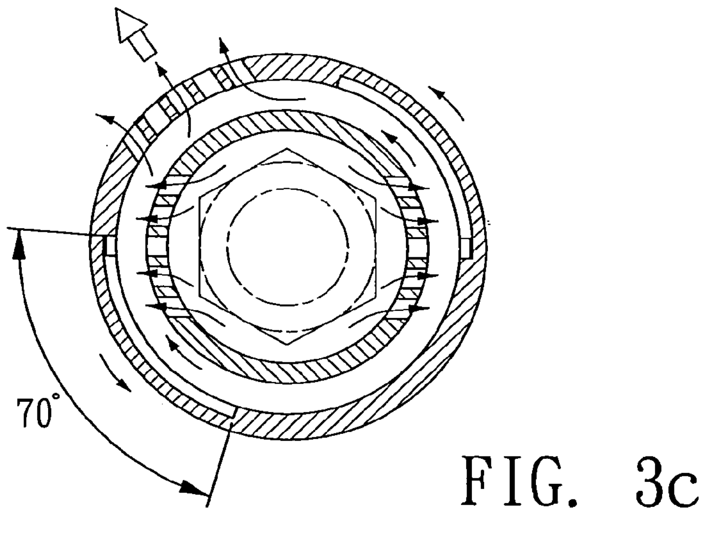
FIG. 3*c* is another applied view showing the operation of the disclosed muffling structure.
Figure 4:
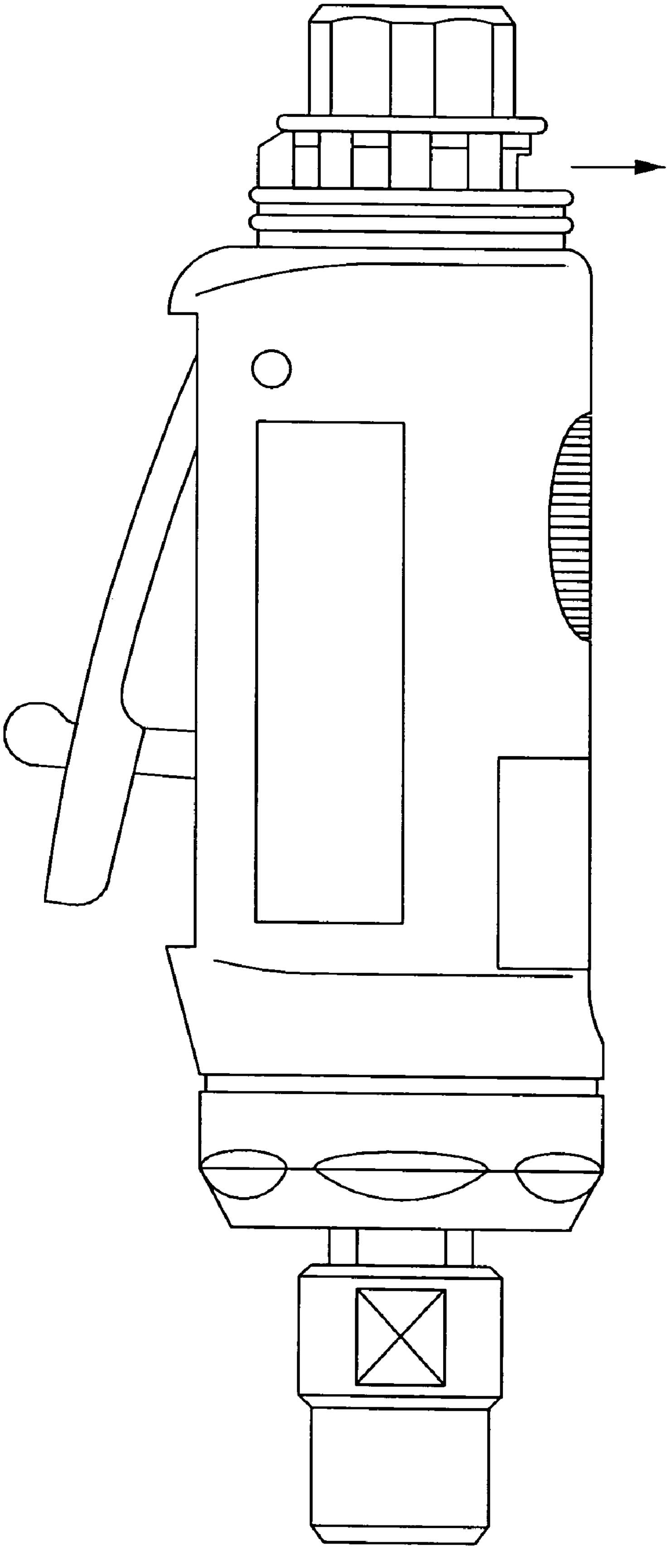
FIG. 4 PRIOR ART
FIG. 4 is a perspective view of a conventional pneumatic grinder.

According to the present embodiment, a pneumatic grinder with improved muffling structure primarily comprises a driving portion 1, a grinding wheel fixing portion 11 provided at one end of the driving portion 1 for carrying a grinding tool (not shown), an air exhaust mechanism 2 combined with the other end of the portion driving portion 1 by means of a combining portion 23 thereof, and a switch 12, wherein the disclosed muffling structure is included in the air exhaust mechanism 2 and having:

a first housing 21, which has a plurality of first exhaust openings 211 penetrating through the inner surface and outer surface of the first housing 21, a first limit segment which in the present embodiment is composed of a pair of projections 212 respectively situated at the opposite sides of the first housing 21, a retaining segment 213 positioned on the first housing 21 between the first exhaust openings 211 and projections 212, and an elastic ring 214 settled between the projections 212 and retaining segment 213 wherein the first housing 21 in the present embodiment is an annular housing while the retaining segment 213 is an annular flange; and a second housing 22, which is also an annular housing for coupling with the first housing 21 to form the air exhaust mechanism and has a plurality of second exhaust openings 221 arranged in staggered fashion with the first exhaust openings 211 of the first housing 21, a second limit segment which in the present embodiment is composed of a pair of recesses 222 respectively situated at the opposite sides of the second housing 22, a groove 223 arranged at the inner surface of the second housing 22 between the second exhaust openings 221 and recesses 222 for being engaged with the retaining segment 213 of the first housing 21 in order to fasten the second housing 22 upon the first housing 21. Thereby, the second housing 22 can be rotated around the first housing 21 within a predetermined range defined by the assembly of the projections 212 on the first housing 21 and the recesses 222 on the second housing 22. As can be seen in FIGS. 3*a*, 3*b* and 3*c*, the rotatable angle of the second housing 22 is preferably 70 degrees. Thus, by the combination of the rotatable angle as well as the staggered positions of the exhaust openings 211, 221 of the first housing 21 and second housing 22, it is ensured that the second exhaust openings 221 of the second housing 22 can never come into coincidence with the first exhaust openings 211 of the first housing 21 despite the rotation of the second housing 22. Further, an annular space 3 is therefore defined between the inner surface of the second housing 22 and the outer surface of the first housing 21.

Furthermore, according to the present embodiment, the combining portion 23 can be an air inlet which has one end fastened to a threaded hole 13 provided at one end of the air exhaust mechanism 2 and thereby compresses the first housing 21 tightly onto the grinder while the other end thereof is fixedly attached by a quick connector (not shown).

Through foresaid structure, waste air produced during operation of the grinder is guided into the first housing 21 and discharged into the annular space 3 by way of the first exhaust openings 211. At this time, as the airflow encounters the inner surface of the second housing 22, it is dispersed and discharged piecemeal out of the grinder through the second exhaust openings 221 of the second housing 22 to achieve reduction of the noise of direct airflow. On the other hand, as the second housing 22 is relatable with respect to the first housing 21, the angle of the second exhaust openings 221 diverging from the first exhaust openings 211 can be adjusted and simultaneously the direction of the discharged airflow expelled from the second exhaust openings 221 can be changed.

As a conclusion, by foresaid two layers of staggered exhaust openings arranged on the first housing 21 and second housing 22, waste airflow is inevitably disrupted and scattered. Consequently, noise generated during air exhaust can be efficiently reduced so that possible physical damage caused by the noise to a grinder operator can be abated.

What is claimed is:

1. A pneumatic grinder with improved muffling structure primarily composed of a driving portion, a grinding wheel fixing portion provided at one end of the driving portion, an exhaust mechanism combined with the other end of the driving portion by means of a combining portion thereof, a switch positioned at one side of the driving portion which is characterized by the exhaust mechanism that further comprises:

a first housing fixed at one end of the driving portion by the compressing of the combining portion, and having a plurality of first exhaust openings penetrating through the inner surface and outer surface of the first housing and a first limit segment provided at the outer surface thereof; and a second housing, which is mounted around the periphery of the first housing to form an annular space between the inner surface thereof and the outer surface of the first housing, and having a second limit segment for being mated with the first limit segment whereby the second housing can be rotated around the first housing within a predetermined range, and a plurality of second exhaust openings located at the positions not corresponding to those of the first exhaust openings of the first housing.

2. The pneumatic grinder as claimed in claim 1, wherein the first housing comprises a retaining segment at the outer surface thereof which is in an annular form and located between the first limit segment and the first exhaust openings while the second housing comprises a groove for being coupled with the retaining segment of the first housing.

3. The pneumatic grinder with improved muffling structure as claimed in claim 2, wherein the first and second housings are respectively in an annular form and the retaining segment of the first housing is an annular flange while the groove of the second housing is an annular groove.

4. The pneumatic grinder with improved muffling structure as claimed in claim 1, wherein the first limit segment comprises a pair of projections situated at the outer surface of the first housing oppositely and the second limit segment comprises a pair of recesses situated at the opposite inner surface of the second housing oppositely.

* * * * *